(No Model.)  2 Sheets—Sheet 1.

W. RENNYSON.
BICYCLE.

No. 293,081.  Patented Feb. 5, 1884.

WITNESSES:
John E. Parker
James F. Tobin

INVENTOR:
William Rennyson
by his Attorneys
Howson & Sons

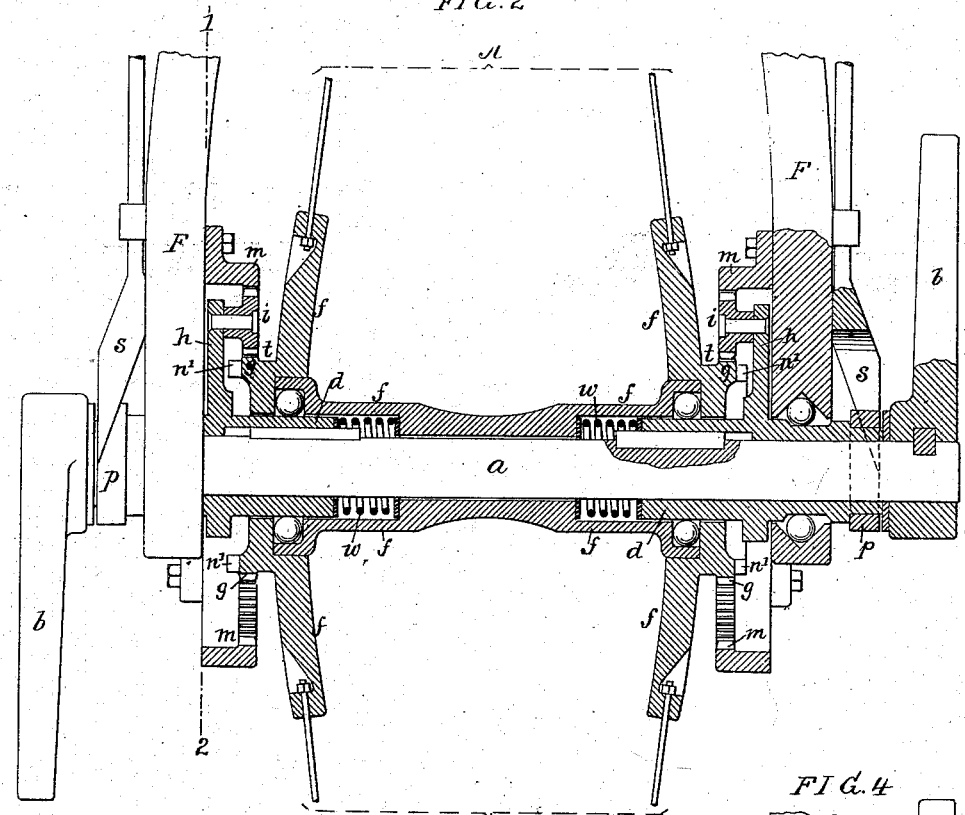
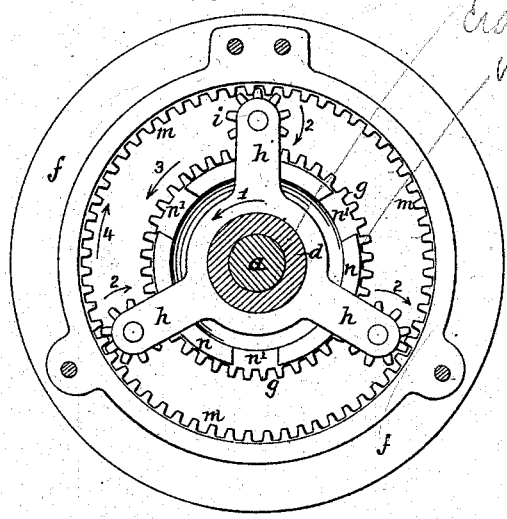
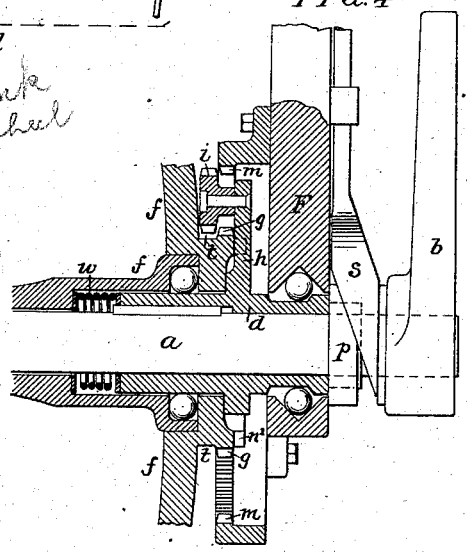

UNITED STATES PATENT OFFICE.

WILLIAM RENNYSON, OF NORRISTOWN, PENNSYLVANIA.

BICYCLE.

SPECIFICATION forming part of Letters Patent No. 293,081, dated February 5, 1884.

Application filed November 12, 1883. (No model.)

*To all whom it may concern:*

Be it known that I, WILLIAM RENNYSON, a citizen of the United States, and a resident of Norristown, Montgomery county, Pennsylvania, have invented certain Improvements in Bicycles, of which the following is a specification.

The main object of my invention is to provide a bicycle or tricycle with gearing whereby the speed of the driving-wheel may be increased, a further object being to prevent the tipping-up of the frame of a bicycle, and a still further object being to provide means whereby the driving-wheel may be locked to the driving or crank shaft when greater power than usual has to be exerted.

Figure 1:
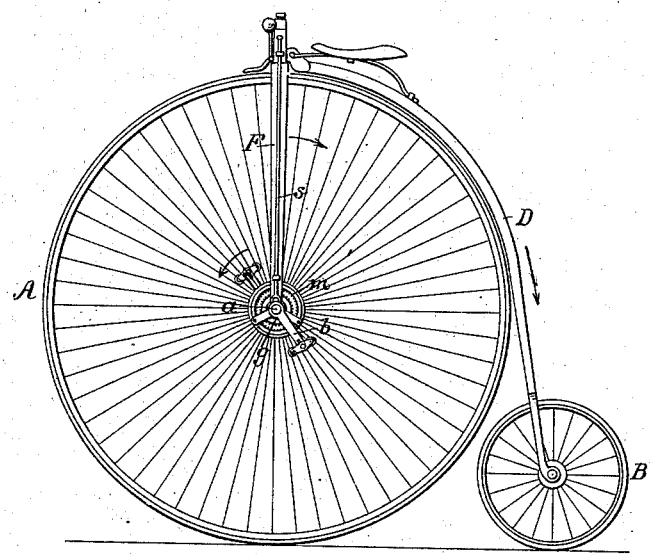

In the accompanying drawings, Figure 1, Sheet 1, is a side view of a bicycle with my improvements; Fig. 2, Sheet 2, a transverse section, on a larger scale, of the crank-shaft and a portion of the driving-wheel and frame of the bicycle; Fig. 3, a section on the line 1 2, Fig. 2; Fig. 4, a view of part of Fig. 2, but with the parts in a different position; and Fig. 5, Sheet 1, a view of a modification.

In Fig. 1, A represents the driving-wheel; B, the small rear wheel; D, the backbone or frame, and F the steering-yoke which carries at the lower end the shaft *a*. This shaft, as shown at Fig. 2, has opposite cranks *b*, securely keyed or bolted thereto.

To the usual ball-bearings in the lower ends of the yoke F are adapted sleeves *d*, which are keyed to, and turn with, but are free to slide longitudinally on, the shaft *a*, the opposite ends of the hub *f* of the wheel being recessed for the reception of the inner ends of said sleeves, and also furnished with ball-bearings, so that the wheel A is at liberty to turn freely on the sleeves.

Secured to and projecting outward from the opposite ends of the hub *f* of the wheel are spur-wheels *g*, into each of which gear pinions *i*—three in the present instance—carried by arms *h* on the sleeves *d*, these pinions also gearing into internal annular racks, *m*, secured to the lower end of the yoke F. It will thus be seen that as the shaft *a* is rotated the pinions *i* are carried around by the arms *h*, and are caused to turn on their spindles, owing to their engagement with the fixed racks *m*, the movement being transmitted to the spur-wheels *g*, the speed of which, in respect to that of the shaft *a*, is dependent upon the number of teeth in the spur-wheels in proportion to the number in the fixed racks *m*. Thus, if the racks *m* have sixty teeth and the wheels *g* forty teeth, the wheel A will make one and a half turn for each revolution of the shaft *a*, while if there are but half as many teeth in the spur-wheels as in the racks there will be two turns of the wheel A for each revolution of the shaft *a*, and so on. This increased speed of the wheel of course implies corresponding decrease of power, which on a race-track or other well-kept road is not an objection. There are occasions, however, when power is more to be desired than speed; hence I provide means for throwing the speed-increasing gear out of action and locking the wheel to the crank-shaft in such cases.

On each spur-wheel *g* is a projecting flange, *n*, in which are formed a series of notches, *n'*, each of a width somewhat greater than that of one of the arms *h*, and between the spur-wheels *g* and the ends of the hub *f* are recesses *t*, so that on moving the sleeves *d* inward on the shaft *a*, the pinions *i* will be moved clear of the teeth of the wheels *g* and racks *m*, and the arms *h* will be caused to engage with the notched flanges *n*, as shown in Fig. 4, thus locking the wheel A to the shaft *a* and permitting the application of full power to said wheel.

The lateral movement of the sleeves *d* may be effected by various means. In the present instance the inner ends of the sleeves are acted upon by spiral springs *w* contained in the recessed ends of the hub, and the outer ends of the sleeves are shouldered, to form bearings for collars *p*, which are under the influence of wedge-bolts *s*, guided on the yoke F, the depression of these bolts causing the sleeves to be thrust inward, and the springs *w* causing the outward movement of the sleeves on the elevation of the bolts.

It will be observed on reference to Fig. 3 that as the pinions *i* are carried around by the arms *h* in the direction of the arrow 1 they are caused to turn on their spindles in the direction of the arrows 2, and thus not only cause the forward movement of the spur-wheel *g* in the direction of the arrow 3, but also tend to turn the rack *m* in the direction of the arrow 4. The effect of this is to impart a rearward thrust to the upper end of the yoke F and frame D, thus keeping the rear wheel, B, firmly upon the ground, the common tendency of the frame to tip up and throw the rider from his seat, or, as it is termed, cause a "header" or "cropper" being effectually overcome and the safety of the machine thus materially enhanced.

Figure 5:
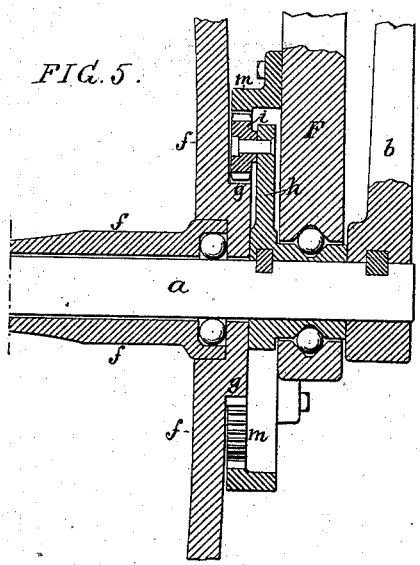

The speeding-gear which I have shown and described may be used on tricycles as well as bicycles, the shaft $a$ in such cases being provided with pulleys connected by chain-belts with pulleys on the crank-shaft in the usual manner, and when it is not desired to lock the wheel A to the driving-shaft the sleeves $d$ may be dispensed with, the wheel turning on and the arms $h$ being carried by the shaft $a$, as shown in Fig. 5. Friction-gearing may be substituted for the toothed gearing, if desired, although the latter is preferred; but I wish it to be understood that I consider the terms "rack," "pinion," and "spur-wheel" to apply as well to such friction-gears as to the toothed gearing shown in the drawings. The gearing may be used upon one side of the wheel only, if desired, and a single arm, $h$, only, or as many of such arms as may be deemed expedient may be used in each set of gearing.

I am aware that it is common in speed-changing gear for velocipedes to use an outer annular rack, a central spur-wheel, and intermediate pinions meshing into said spur-wheel and rack, but these parts have not been combined with the fixed frame, driving-wheel, and driving-shaft in the peculiar manner above set forth, for the purpose of increasing the speed of the wheel; hence

I claim as my invention—

1. The combination of the driving-shaft $a$ of a bicycle or tricycle, the driving-wheel A, free to turn thereon, and having a spur-wheel, $g$, the fixed annular rack $m$, and an arm, $h$, turning with the shaft $a$ and carrying a pinion, $i$, which gears into said spur-wheel and rack, as set forth.

2. The combination of the rear wheel, B, frame D, and steering-yoke F of a bicycle with the crank-shaft $a$, the driving-wheel A, free to turn thereon, and having a spur-wheel, $g$, the annular rack $m$, secured to the yoke F, and an arm, $h$, turning with the shaft $a$ and carrying a pinion, $i$, gearing into said spur-wheel and rack, as set forth.

3. The combination of the driving-shaft $a$ of a bicycle or tricycle, the wheel A, free to turn thereon, and having a spur-wheel, $g$, the fixed annular rack $m$, a sleeve, $d$, adjustable laterally on the shaft $a$, and having an arm, $h$, with pinion $i$, which, as the sleeve is moved laterally, engages with or is disengaged from the spur-wheel and rack, and means, substantially as described, whereby the wheel is locked to the sleeve as the pinion is thrown out of gear, as set forth.

In testimony whereof I have signed my name to this specification in the presence of two subscribing witnesses.

WILLIAM RENNYSON.

Witnesses:
JOHN M. CLAYTON,
HARRY SMITH.